May 10, 1955     W. VAN B. ROBERTS     2,708,237
SELECTIVE FREQUENCY CHANGER
Filed July 11, 1951
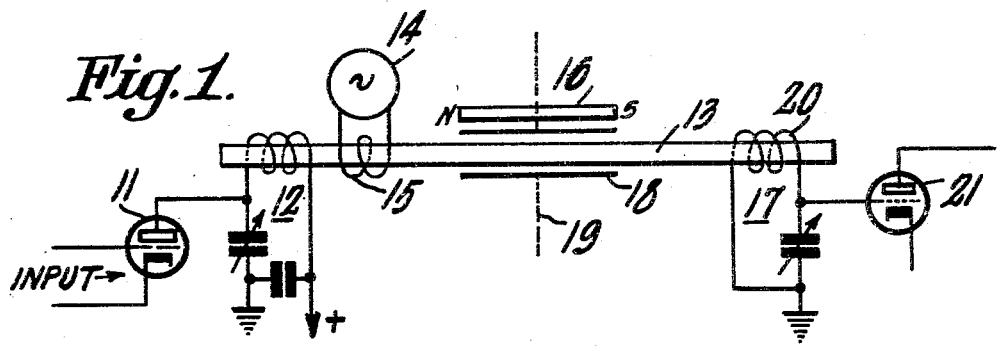
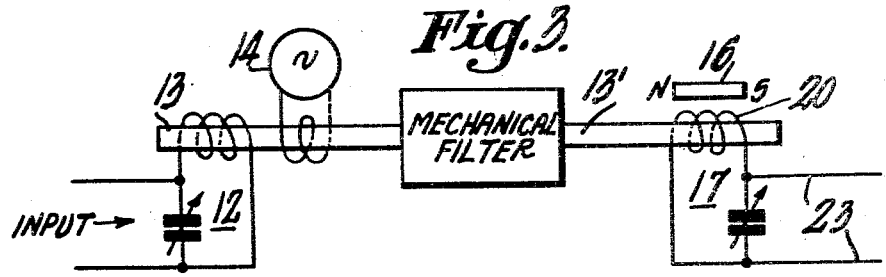
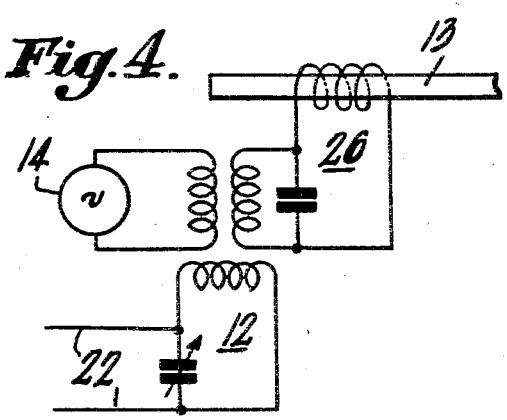
INVENTOR
*Walter van B. Roberts*
BY
*Conder C. Henry*
ATTORNEY

United States Patent Office 2,708,237
Patented May 10, 1955

2,708,237

SELECTIVE FREQUENCY CHANGER

Walter van B. Roberts, Princeton, N. J., assignor to Radio Corporation of America, a corporation of Delaware Application July 11, 1951, Serial No. 236,227

15 Claims. (Cl. 250—20)

My invention relates to an intermediate frequency apparatus and more particularly to a frequency changer and tuned intermediate frequency selector employing magnetostrictive elements.

It is an object of my invention to provide a means for selectively converting signal frequency energy to intermediate frequency energy utilizing a sharply tuned magnetostrictive element.

Another object of my invention is to provide an improved intermediate frequency selector which possesses high sensitivity and is of rugged and inexpensive construction.

It is a further object of my invention to provide a single element which functions in a frequency changer as an intermediate frequency selector.

In general, my invention comprises a local oscillator and an input radio frequency signal which are inductively coupled to one end of a tuned magnetostrictive rod, and in which the fundamental frequency of the tuned magnetostrictive rod is the difference between the frequency of the signal and the oscillator currents, and also in which the magnetostrictive rod acts as a sharply tuned mechanical filter, and the resultant beat frequency signal is inductively coupled to an output circuit preferably near the other end of the rod, whereby a desired intermediate frequency voltage is induced in the output circuit.

The above and other objects and advantages of my invention will become apparent upon consideration of the following detailed description taken in conjunction with the accompanying drawings, in which like numerals are used to indicate like elements throughout. In the drawings, Fig. 1 is a diagrammatic representation of one form of my invention, wherein a single magnetostrictive rod is employed;

Fig. 2 illustrates a modification of the rod illustrated in Fig. 1;

Fig. 3 is a schematic diagram of another form of my invention, in which a mechanical filter is located in the center portion of the rod shown in Fig. 2; and Fig. 4 is a modification of a part of my invention.

The following description perhaps will be better understood by pointing out that there are two separate mechanisms by which mechanical vibrations can be produced electrically, viz:

First, a pure alternating current field on a ferrite core produces a force therein which has a steady component because each half of the magetizing wave produces force of the same sign. In such arrangement, if the alternating current amplitude varies, the average force correspondingly varies. Also, in such arrangement, when signal and local oscillator currents are superimposed, the resultant is an alternating current modulated at the best frequency, and when the beat frequency is adjusted to coincide with the frequency of mechanical resonance, a relatively large amplitude of vibration occurs. For this mode of operation no constant field is required except where it is required to convert vibration into voltage in an output coil.

Second, the flux produced in a ferrite core by a pure alternating current field is symmetrical about zero, but it is non-linear with respect to the field. Hence, if a constant field is superimposed to bring the operating point to a strongly curved part of the flux field characteristic, the average flux will not be zero but will vary with modulation of the alternating current field. Thus the combination of a constant field, a signal field, and a local oscillator field produces a beat frequency component of flux. Such flux could be used to induce intermediate frequency voltage in an intermediate coil without making use of mechanical vibration, or the beat frequency may be adjusted to match the resonant vibration frequency of the ferrite, and then the cooperation of the beat frequency flux and the steady field sets up relatively strong vibration. My invention contemplates the latter use.

Referring in detail to Fig. 1, signals are applied to the grid of an electron control device, such as an R. F. amplifier tube, 11. The tuned plate circuit, 12, of the tube and the output of a local oscillator, 14, are inductively coupled to a ferrite rod, 13, at one end thereof. Currents from the tuned plate circuit and the oscillator combine to magnetize the rod. A magnet, 16, is positioned near the center of the rod. Consequently, the currents from the oscillator and the signal source, together with the field of the magnet, combine to produce a beat frequency component of flux in the rod.

When the frequencies of the oscillator and the signal source differ by the natural mechanical frequency of the rod, the latter will vibrate. This vibration together with the field of the magnet induces a vibration frequency voltage in a tuned intermediate frequency circuit, 17, which is inductively coupled to the end of the rod remote from the oscillator and the signal source. It is desirable to prevent beat frequency voltage from being induced in the tuned circuit by the beat frequency component of flux produced by the signal source and the oscillator, and for this purpose I place a tubular shield, 18, around the center portion of the rod and employ conventional shielding as indicated by the dotted line, 19.

If the tuned intermediate frequency circuit is tuned to the frequency difference between the signal source and the oscillator, a very sharp selectivity curve can be obtained. The length of the rod is preferably made at least equal to three half waves.

In Fig. 2 is illustrated a composite rod which may be used in place of the rod shown in Fig. 1. The rod shown in Fig. 2 is composed of a central metal section, 25, with magnetostrictive ends, 13 and 13', attached thereto. Each of the end pieces, 13 and 13', is preferably made a half wavelength long at the desired intermediate frequency so that the forces at the joints will be small. While the metal center portion is illustrated as being any desired number of half waves in length, yet one-half wavelength would be preferred. The advantage of the composite construction is that it insures shielding between the driving and take-off ends of the rod and permits choosing a material with a desired mechanical Q. In substituting this type of element for the element shown in Fig. 1, the coils 12 and 15 would be coupled to the end section 13 while the coil 20 would be coupled to the end section 13'. Since the center section 25 is of non-magnetostrictive material, the shield 18 shown in Fig. 1 may not be required when using the type element shown in Fig. 2.

A modification of my invention is illustrated in Fig. 3 In this figure, the inputs of the signal circuit, 12, and the local oscillator, 14, act as previously described on the magnetostrictive rod, 13. This rod drives the input end of a mechanical filter, and the output motion of such filter drives a second magnetostrictive rod, 13'. It will be understood that the mechanical filter may be designed to pass a wider band of frequencies, but at the same time have more rapid cut-off outside the pass band than is practical in electrical filters. The vibration of the second magnetostrictive rod in the presence of a magnetic field introduces an intermediate frequency voltage in the tuned output circuit, 17. For this purpose I employ a magnet 16 at the output end of the magnetostrictive element 13. The magnetic field on the magnetostrictive element, 13, is adjusted for maximum voltage in the tuned output circuit, while the field of the magnet on the second magnetostrictive element is adjusted for the most uniform response over the desired band. The magnetostrictive element shown in Fig. 2 may be substituted for the arrangement shown in Fig. 3 in the same manner as described for its substitution in the arrangement shown in Fig. 1.

Although Figs. 1 and 3 show separate coils for the signal and oscillator currents wound around rod 13, this particular construction employing separate coils is not necessary. Fig. 4 shows an arrangement where both of these currents are brought together into a single coil wound around rod 13. The tuning of this single coil by means of tuned circuit 26 to the beat frequency provides a low impedance path for the beat frequency current, thus permitting a greater amount of it to be generated.

What I claim is:

1. A selective frequency changer comprising a magnetostrictive rod, a thermionic tube having an anode, a cathode and a control grid, means for applying radio frequency signals to said control grid, said tube having a tuned plate circuit inductively coupled to one end of said rod, a local oscillator having its output inductively coupled to said one end of said rod, said tuned plate circuit and said oscillator operating at different frequencies, the magnetizing forces of said tuned plate circuit and said oscillator combining to set up a beat frequency component of flux in said rod, said beat frequency component of flux causing said rod to vibrate at its natural mechanical frequency, a permanent magnet located adjacent the said center portion of said rod, an intermediate frequency circuit tuned to said natural mechanical frequency, said tuned intermediate frequency circuit being inductively coupled to the end of said rod remote from said one end of said rod, the field of said magnet and the movement of said rod cooperating to cause an intermediate frequency voltage to be induced in said tuned intermediate frequency circuit, and shielding means whereby the beat frequency voltage of said tuned plate circuit and said oscillator is prevented from being induced in said tuned intermediate frequency circuit.

2. Selective frequency apparatus comprising a magnetostrictive element, means establishing a steady electromagnetic field about at least one end of said element, means establishing a first magnetomotive field which varies in accordance with radio frequency signals, means establishing a second magnetomotive field having a predetermined frequency, means combining said first and second fields, means coupling said combined first and second fields to the other end of said element causing said element to vibrate at its natural mechanical frequency, said natural mechanical frequency being the beat frequency produced in said element by said combined fields, and an output circuit tuned to said natural mechanical frequency coupled to said one end of said element.

3. Selective frequency apparatus in accordance with claim 2 in which said magnetostrictive element comprises a ferrite rod.

4. Selective frequency apparatus in accordance with claim 2 in which said magnetostrictive element comprises a multisectional device having magnetostrictive end sections coupled by a non-magnetostrictive section.

5. Selective frequency apparatus in accordance with claim 4 in which each of said sections has a length equal to one-half the wavelength of said beat frequency.

6. Selective frequency apparatus in accordance with claim 4 in which said coupling section comprises a metal section.

7. Selective frequency apparatus in accordance with claim 4 in which said coupling section comprises a mechanical filter.

8. Selective frequency apparatus in accordance with claim 2 and including shielding means preventing said beat frequency component of flux from inducing a voltage in said output circuit.

9. Selective frequency apparatus comprising a magnetostrictive element, means establishing a steady electromagnetic field about at least one end of said element, means inductively coupled to the other end of said element for inducing a field about said other end corresponding to radio frequency signals, additional means inductively coupled to said other end of said element for inducing a field about said other end having a frequency different from the frequency of said signals, the magnetizing forces of said radio frequency field and said different field combining to set up a beat frequency component of flux causing said element to vibrate at its natural mechanical frequency, and an output circuit tuned to said natural mechanical frequency coupled to said one end of said element.

10. Selective frequency apparatus in accordance with claim 8 in which said magnetostrictive element comprises a ferrite rod.

11. Selective frequency apparatus in accordance with claim 8 in which said magnetostrictive element comprises a multisectional device having magnetostrictive end sections coupled by a non-magnetostrictive section.

12. Selective frequency apparatus in accordance with claim 11 in which each of said sections has a length equal to one-half the wavelength of said beat frequency.

13. Selective frequency apparatus in accordance with claim 11 in which said coupling section comprises a metal section.

14. Selective frequency apparatus in accordance with claim 11 in which said coupling section comprises a mechanical filter.

15. Selective frequency apparatus in accordance with claim 9 and including shielding means preventing said beat frequency component of flux from inducing a voltage in said output circuit.

References Cited in the file of this patent

UNITED STATES PATENTS

| | | |
|---|---|---|
| 1,693,662 | Ohl | Dec. 4, 1928 |
| 2,454,933 | Luck | Nov. 30, 1948 |
| 2,574,647 | Lorenzen | Nov. 13, 1951 |
| 2,605,354 | Burns et al. | July 29, 1952 |
| 2,612,603 | Nicholson | Sept. 30, 1952 |